(12) United States Patent
Ide

(10) Patent No.: US 6,941,117 B2
(45) Date of Patent: Sep. 6, 2005

(54) PORTABLE RADIO HAVING PIVOTABLE ANTENNA

(75) Inventor: Yoshiyuki Ide, Tokyo (JP)

(73) Assignee: NEC Corporation (JP)

(*) Notice: Subject to any disclaimer, the term of this patent is extended or adjusted under 35 U.S.C. 154(b) by 713 days.

(21) Appl. No.: 09/799,982

(22) Filed: Mar. 6, 2001

(65) Prior Publication Data

US 2001/0019944 A1 Sep. 6, 2001

(30) Foreign Application Priority Data

Mar. 6, 2000  (JP) ....................... 2000-059872

(51) Int. Cl.[7] .............................. H04B 1/38
(52) U.S. Cl. ............. 455/90.1; 455/575.1; 455/575.7; 455/569.1; 455/90.3; 455/562.1; 455/550.1; 455/128; 343/702; 343/881; 343/882; 343/895
(58) Field of Search ............... 455/90.1, 90.3, 455/575.1, 569.1, 550.1, 67.11, 128, 129; 343/700 R, 702, 881

(56) References Cited

U.S. PATENT DOCUMENTS

| | | | |
|---|---|---|---|
| 5,218,370 A | * 6/1993 | Blaese | 343/702 |
| 5,991,644 A | * 11/1999 | Ogawa | 455/566 |
| 6,002,945 A | * 12/1999 | McDuffee | 455/556.1 |
| 6,005,521 A | * 12/1999 | Suguro et al. | 343/700 MS |
| 6,052,567 A | * 4/2000 | Ito et al. | 455/575.7 |
| 6,075,487 A | * 6/2000 | Ito | 343/702 |
| 6,104,356 A | * 8/2000 | Hikuma et al. | 343/853 |
| 6,125,289 A | * 9/2000 | Lee | 455/575.3 |
| 6,130,646 A | * 10/2000 | Jang | 343/721 |
| 6,285,328 B1 | * 9/2001 | Masaki et al. | 343/702 |
| 6,380,897 B1 | * 4/2002 | Shaw et al. | 343/702 |
| 6,646,606 B2 | * 11/2003 | Mikkola et al. | 343/700 MS |
| 6,681,125 B1 | * 1/2004 | Woo | 455/106 |

FOREIGN PATENT DOCUMENTS

| | | | |
|---|---|---|---|
| EP | 0661824 | 7/1995 | |
| EP | 0661825 | 7/1995 | |
| EP | 0703691 | 3/1996 | |
| EP | 0898405 | 2/1999 | |
| FR | 0703691 A2 | * 3/1996 | ............ H04M/1/02 |
| GB | 2333005 | 7/1999 | |
| JP | 4-354425 | 12/1992 | |
| JP | 7-203524 | 8/1995 | |
| JP | 10-261910 | 9/1998 | |
| JP | 11-98046 | 4/1999 | |
| JP | 2000269715 | 9/2000 | |
| WO | WO00/38274 | 6/2000 | |

OTHER PUBLICATIONS

Japanese Office Action dated Nov. 4, 2003 (w/English translation of relevant portion).

* cited by examiner

Primary Examiner—Marceau Milford
(74) Attorney, Agent, or Firm—Dickstein, Shapiro, Morin & Oshinsky, LLP.

(57) ABSTRACT

A folding, portable radio device is provided, which optimizes the gain characteristic of an antenna optionally. This device comprises (a) a first package; (b) a second package connected pivotably to the first package around a specific axis with a joint; the second package being able to be held at a desired angle with respect to the first package; (c) an antenna attached to the second package; (d) a third package connected pivotably to the first package around the axis with the joint; the third package being adjacent to the first package; the third package being abcle to be held at a desired angle with respect to the first package; and (e) a radio section mounted on at least one of the first, second, and third packages. Preferably, the joint comprises a first pivot limiter for defining the maximum angle of the second package and a second pivot limiter for defining the maximum angle of the third package.

13 Claims, 9 Drawing Sheets

PORTABLE RADIO HAVING PIVOTABLE ANTENNA

BACKGROUND OF THE INVENTION

1. Field of the Invention

The present invention relates to a portable radio device such as portable information terminals, portable or cellular phones, and so on, and more particularly, to a folding, portable radio device having a pivotable antenna, in which the gain characteristic of the antenna is adjustable independent of the angle between the foldable packages around the specific axis.

2. Description of the Related Art

For portable radio devices such as portable information terminals, portable or cellular phones, and so on, antenna gain degradation is a serious problem that affects badly the communication performance. The first cause of this problem is the loss due to the fact that the maximum radiation orientation of the radiation pattern of an antenna does not accord with the orientation of incoming radio waves and/or the plane of polarization of an antenna does not accord with that of the incoming radio waves. The second cause of the same problem is the loss due to a human body Concretely speaking, when portable radio devices of this type are used outside buildings or structures, the orientation of incoming radio waves is usually horizontal. Also, the plane of polarization of incoming radio waves is typically vertical, because vertical polarized radio waves has been usually used for transmitting operation as used in the Personal Digital Cellular (PDC) method to provide the digital automobile telephone and mobile telephone services. Thus, it is usual chat a half wavelength dipole antenna is used as the antenna of portable radio devices of this type, where a half wavelength dipole antenna has a radiation pattern like the number "8" that provides an advantage that the radiation pattern scarcely changes in horizontal directions. In this case, when portable radio devices of this type are in use, it is ideal that the antenna is held vertically to cope with vertical polarized radio waves.

Some of portable radio devices of this type are formed to be foldable to protect the operation buttons/switches and the display screen when they are not in use and are simply transferred. Conventionally, folding, portable radio devices of this type have a typical configuration that two packages are pivotably connected to each other with a hinge-shaped joint and that a telescopic whip antenna or a coil-shaped fixed antenna is mounted on one of the two packages. An example of this configuration is shown in FIG. 1.

In FIG. 1, the conventional folding, portable radio device 100, which is a portable information terminal, comprises a keyboard package 104 with a keyboard 106 and a screen package 103 with a display screen 107. These two packages 103 and 104 are pivotably connected to each other with a joint 105 like a hinge. A whip antenna 101 is usually attached to the screen package 103, because the antenna 101 is kept as high as possible when the device 100 is in use.

With a conventional folding, portable or mobile phone, there are provided with a transmitter package with a set of operation keys and a microphone, and a receiver package with a display screen and a speaker. These two packages are pivotably connected to each other with a hinge-shaped joint. A whip antenna is usually attached to the receiver package, because the antenna is kept as high as possible when the device is in use.

With the conventional folding, portable radio device (i.e., portable information terminal) 100 shown in FIG. 1, however, there is the following problem.

Specifically, when the device 100 is in use, it is usually held in such a way that the packages 103 and 104 are at an angle of approximately 180°. Thus, the antenna 101 is likely to be in an approximately horizontal position, resulting in gain degradation of the antenna 101.

FIG. 2 shows a graph showing the gain change of a half wavelength dipole antenna as a function of the tilt angle in a free space. The tilt angle of 0° means that the antenna is held vertically, where the gain is 0 dBd. The tilt angle of 90° means that the antenna is held horizontally. As seen from FIG. 2, the gain is decreased to −5 dBd and 10 dBd when the tilt angle is set at 60° and 90°, respectively.

Also, if the conventional device 100 is placed on a steel desk while the packages 103 and 104 are at an angle of an approximately 180°, the antenna 101 tends to contact or to be near the desk surface. In this state, the gain of the antenna 101 will decrease furthermore due to impedance mismatching.

Besides, with a conventional folding, portable or mobile phone, it is usually contacted with or located near the head of a human body during operation. In this case, a human body generates a shade of the phone for incoming electromagnetic waves and therefore, the radiation pattern will deform, degrading the antenna gain.

The reference character a in FIG. 2 indicates the decreased gain level when the antenna of the phone is placed near the head of a human body. Seeing the abscissa at the intersection of the gain curve with the horizontal line a, the state where the antenna is placed near the head of a human body corresponds to the state where the antenna is tilted at an angle of 60° from the vertical direction.

As explained above, with the conventional folding, portable radio devices, the antenna gain varies dependent on the angle between the packages connected pivotably and/or the location where the devices are used.

SUMMARY OF THE INVENTION

Accordingly, an object of the present invention is to provide a folding, portable radio device that optimizes the gain characteristic of an antenna optionally.

Another object of the present invention is to provide a folding, portable radio device that ensures the angle of an antenna to be adjusted independent of the angle between the packages connected pivotably and the location where the device is used.

The above objects together with others not specifically mentioned will become clear to those skilled in the art from the following description.

A portable radio device according to the present invention comprises:

(a) a first package;
(b) a second package connected pivotably to the first package around a specific axis with a joint;
   the second package being able to be held at a desired angle with respect to the first package;
(c) an antenna attached to the second package;
(d) a third package connected pivotably to the first package around the axis with the joint;
   the third package being adjacent to the first package;
   the third package being able to be held at a desired angle with respect to the first package; and
(e) a radio section mounted on at least one of the first, second, and third packages.

With the portable radio device according to the present invention, the second package having the antenna is connected pivotably to the first package around the specific with the joint and at the same time, the third package is connected pivotably to the first package around the same axis with the joint to be adjacent to the first package. The second package is able to be held at a desired angle with respect to the first package and the third package is able to be held at a desired angle with respect to the first package.

Therefore, the angle of the second package (i.e., the angle of the antenna) with respect to the first package can be determined or selected as desired, which is independent of the angle between the third package and the first package and the location where the device is used. As a result, the gain characteristic or the antenna can be optimized optionally.

In a preferred embodiment of the device according to the invention, the joint comprises a pivot limiter for limiting a maximum angle of the second package with respect to the first package. In this embodiment, there is an additional advantage that the angle of the second package with respect to the first package can be limited less than 180°.

In another preferred embodiment of the device according to the invention, the joint comprises a first pivot limiter for defining a first maximum angle of the second package with respect to the first package and a second pivot limiter for defining a second maximum angle of the third package with respect to the first package. In this embodiment, there is an additional advantage that the angle of the third package with respect to the first package can be set at a different angle from that of the second package with respect to the first package while the angle or the second package with respect to the first package is limited less than 180°.

In still another preferred embodiment of the device according to the invention, the antenna is attached telescopically to the second package in such a way as to be drawable from the second package and retractable thereto.

In a further preferred embodiment of the device according to the invention, the antenna is attached to an opposite end of the second package to the joint.

In a still further preferred embodiment of the device according to the invention, an information input section (e.g., a keyboard, a set of switches and/or buttons operable with a finger or fingers or a pen), an information processing section, and information output section (e.g. a display screen or display elements) are additionally provided, thereby enabling radio communication by way of the radio section.

In this embodiment, it is preferred that the information input section is mounted in the first package while the information processing section and the information output section are mounted in the third package.

Preferably, the radio section is mounted in the third package along with the information output section. Alternately, the radio section is mounted in the second package along with the antenna.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
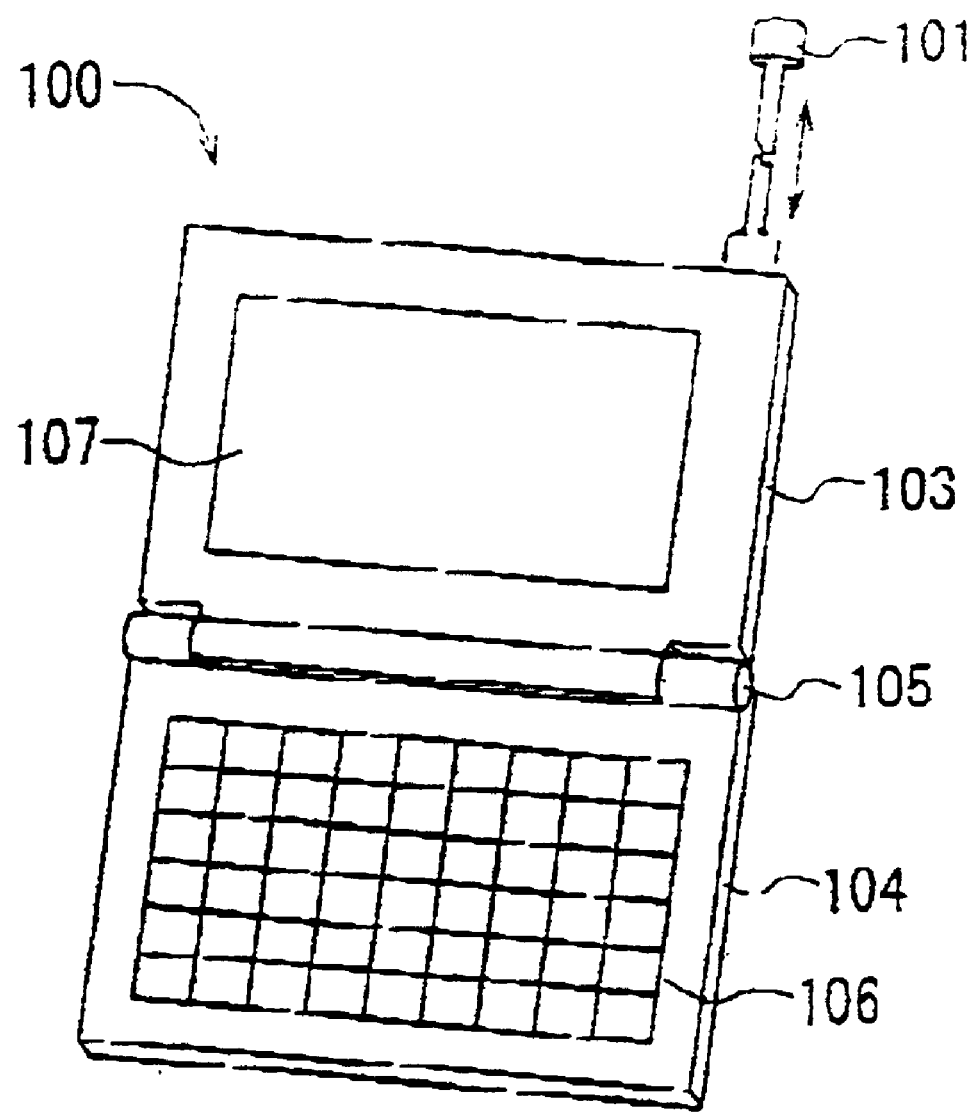
FIG. 1 is a schematic perspective view of a conventional folding, portable radio device, which is designed as a portable information terminal.
Figure 2:
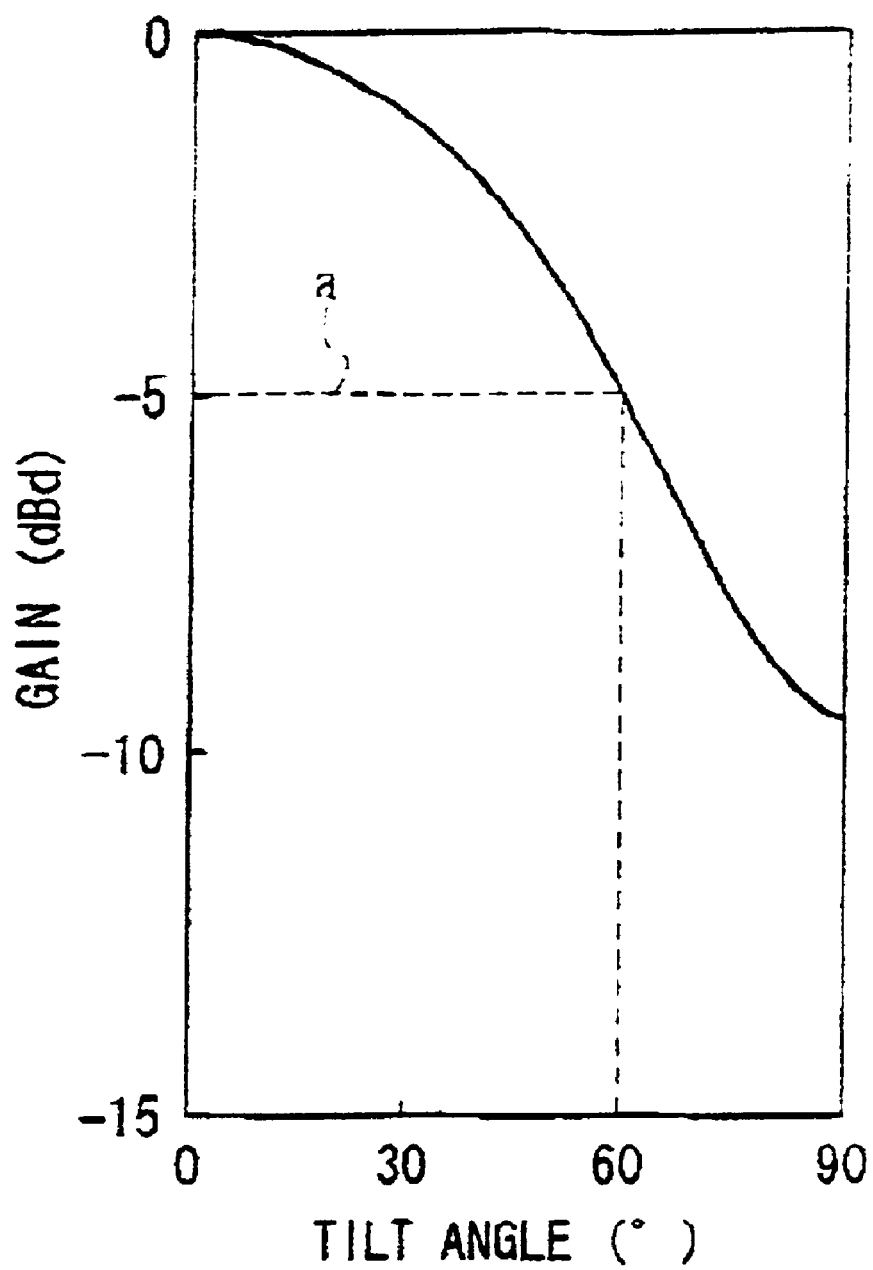
FIG. 2 is a graph showing the gain change of a half wavelength dipole antenna as a function of the tilt angle in a free space.

Preferred embodiments of the present invention will be described in detail below while referring to the drawings attached.

First Embodiment

Figure 3:
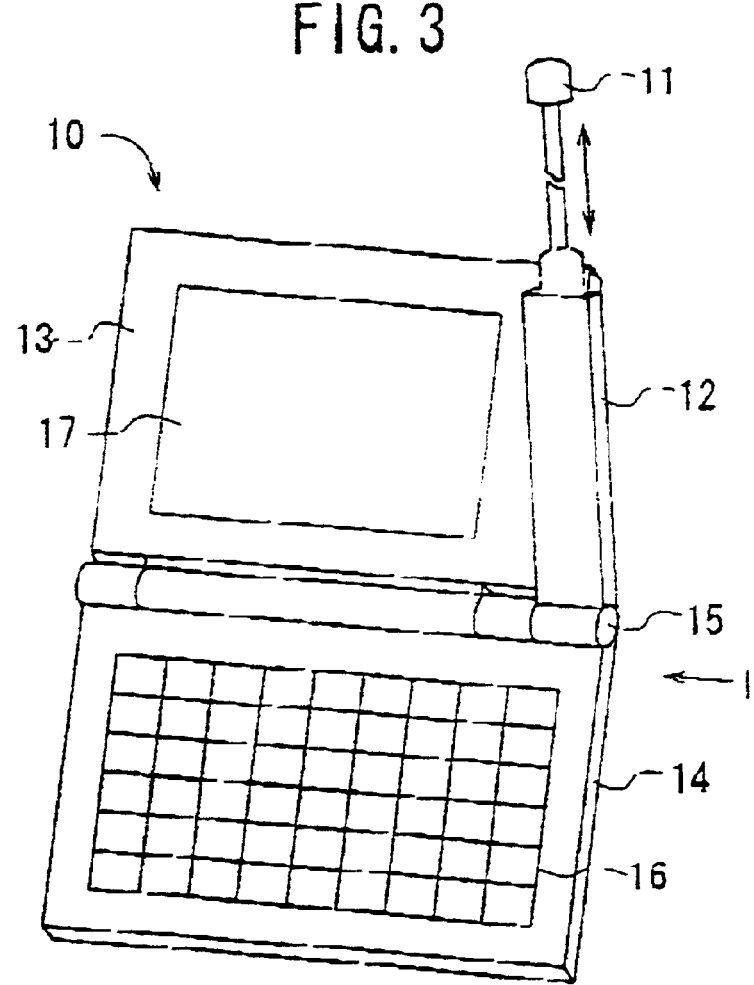
FIG. 3 is a schematic perspective view of a folding, portable radio device according to a first embodiment of the invention, which is designed as a portable information terminal.

As shown in FIG. 3, a folding, portable radio device 10 according to a first embodiment of the invention, which is configured as a portable information terminal, comprises an antenna package 12 with a telescopic whip antenna 11, a screen package 13 with a display screen 17, and a keyboard package 14 with a keyboard 16. The antenna package 12 and the screen package 13 are pivotably connected to the keyboard package 16 with a hinge-shaped joint 15. The joint 15 is fixed at the rear edge of the package 14. Thus, the packages 12 and 13 can be pivoted around the joint 15.

Figure 4:
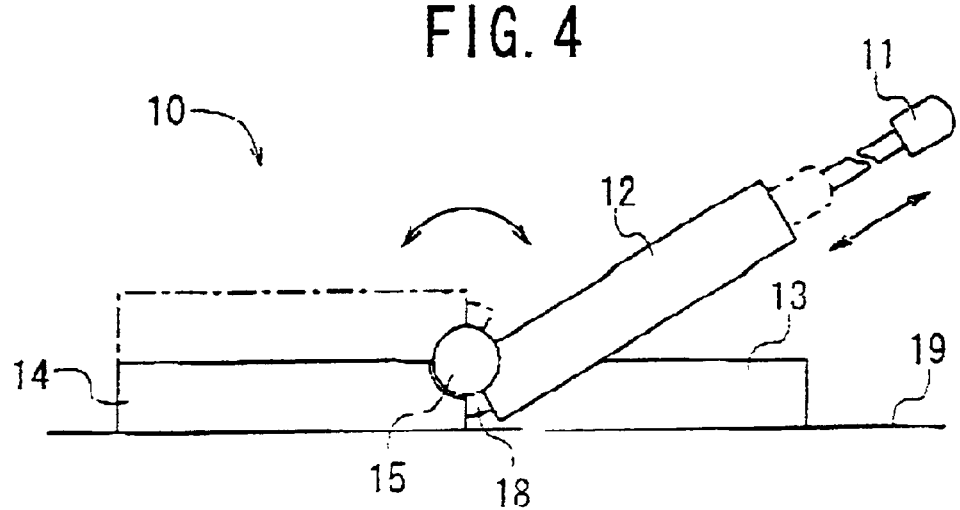
FIG. 4 is a side view of the device according to the first embodiment of FIG. 3, which is seen along the arrow I in FIG. 3.
Figure 5:
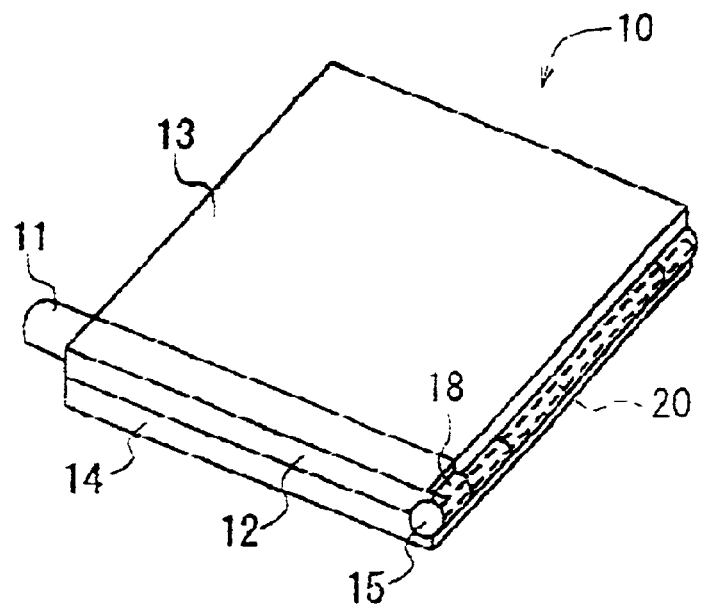
FIG. 5 is a schematic perspective view of the device according to the first embodiment of FIG. 3, in which all the packages are folded.

As shown in FIG. 5, both of the antenna and screen packages 12 and 13 can be completely closed. Also, as shown in FIG. 4, the screen package 13 and be completely opened in such a way as to be placed at an angle of 180° with respect to the keyboard package 14. Unlike this, the antenna package 12 cannot be completely opened in such a way as to be placed at an angle of 180° with respect to the keyboard package 14. The maximum tilt angle of the antenna package 12 with respect to the keyboard package 14 is set at a specific angle less than 180°. For this purpose, a rigid stopper 18 is formed at the bottom end of the antenna package 12 as a pivot angle limiter, as clearly shown in FIG. 4.

The antenna package 12 can be held at a desired angle with respect to the keyboard package 14 as necessary if the desired angle is within its maximum tilt angle. Similarly, the screen package 13 can be held at a desired angle with respect to the keyboard package 14 as necessary if the desired angle is within its maximum tilt angle. The holding operation of the packages 12 and 13 at desired angles is realized by friction at the joint 15.

Figure 6:
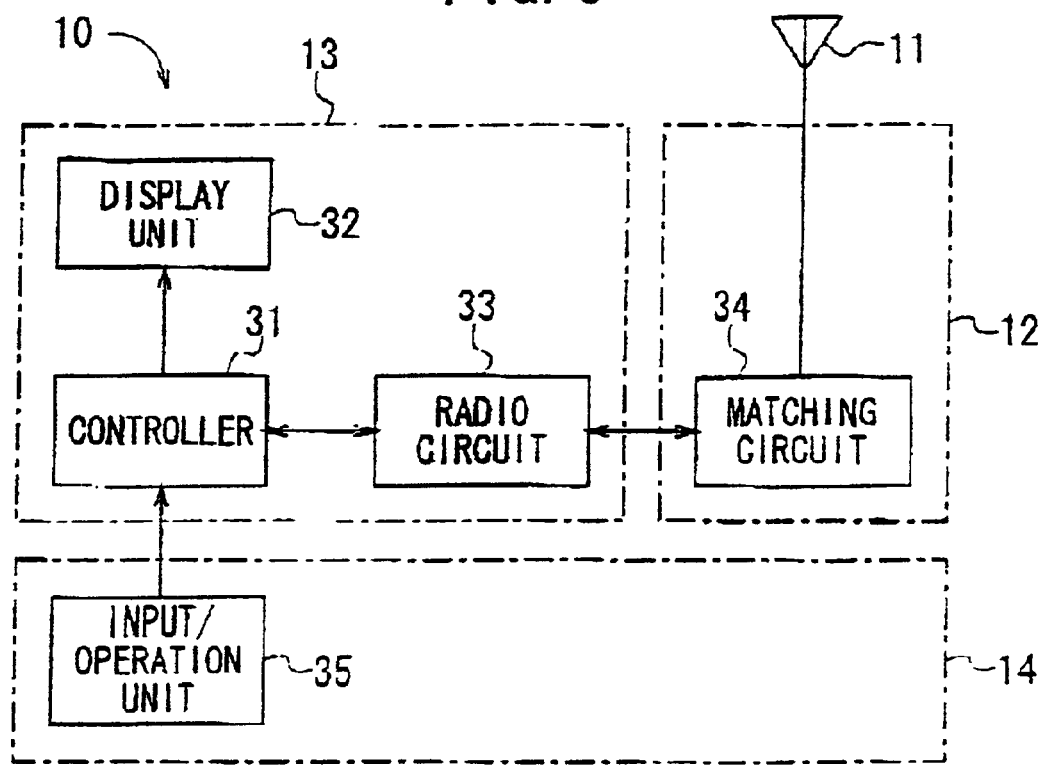
FIG. 6 is a functional block diagram showing the circuit configuration of the device according to the first embodiment of FIG. 3.

The device 10 according to the first embodiment has a circuit configuration As shown in FIG. 6, which is the same as that or conventional devices of this type. As shown in FIG. 6, the device 10 comprises a controller section 31, a display unit 32, a radio circuit section 33, an impedance matching circuit 34, and an input/operation unit 35. The controller section 31 includes a microcomputer for controlling the entire operation of the device 10. The impedance matching circuit 34 is located in the antenna package 12. The controller section 31, the display unit 32, and the radio circuit section 33 are located in the screen package 13 along with the screen 17. The input operation unit 35 is located in the keyboard package 14 along with the keyboard 16.

The user of the device 10 inputs his/her command/direction and/or desired data into the device 10 with the keyboard 16. The command/direction and/or desired data thus inputted is/are subjected to the specific signal processing and sent to the controller section 31 by the input/operation unit 35. The controller section 31 controls the entire operation of the device 10 according to the command/direction thus inputted and processes the inputted data, thereby displaying the results on the screen 17 by way of the display unit 32 as necessary. Also, according to the user's command/direction, the controller section 31 controls the device operation to access a desired communication network in order to acquire specific information and to publish specific information. In this case, the transmission signals outputted from the radio circuit section 33 are transmitted from the antenna 11 to the outside space in the form of radio waves through the impedance matching circuit 34. The radio waves received by the antenna 11 are sent to the radio circuit section 33 by way of the matching circuit 34 and then, then are subjected to specific reception processes.

In the first embodiment explained here, the screen package 13 has a shape of approximately rectangular flat box in which the controller section 31, the display unit 32 and the radio circuit section 33 are incorporated. The rectangular screen 17 is provided on the inner surface of the package 13, as shown in FIG. 3. The screen 17 will be opposite to the keyboard 16 in the keyboard package 14 when the device 10 is in the closed state as shown in FIG. 5. The screen 17 and the display unit 32 may be preferably formed by any so-called flat panel display with low power consumption, such as a Liquid Crystal Display (LCD), Field Emission Device (FED), or the like.

The antenna package 12 has a shape of an elongated box having a rectangular cross section, in which the whip antenna 11 is mounted and the matching circuit 34 is incorporated. The upper end of the package 12, which is opposite to the joint 15, is opened. The top of the antenna 11 is protruded from the package 12 by way of its opening top end. The matching circuit 34 is located between the radio circuit section 33 and the antenna 11.

The keyboard package 14 has a shape of approximately rectangular flat box in which the input/operation unit 35 and a power supply circuit (not shown) are incorporated. The keyboard 16 is mounted in such a way as to be located on the upper surface of the package 14. The overall size of the package 14 is approximately equal to the sum of the surface areas of the antenna and screen packages 12 and 13.

Figure 7:
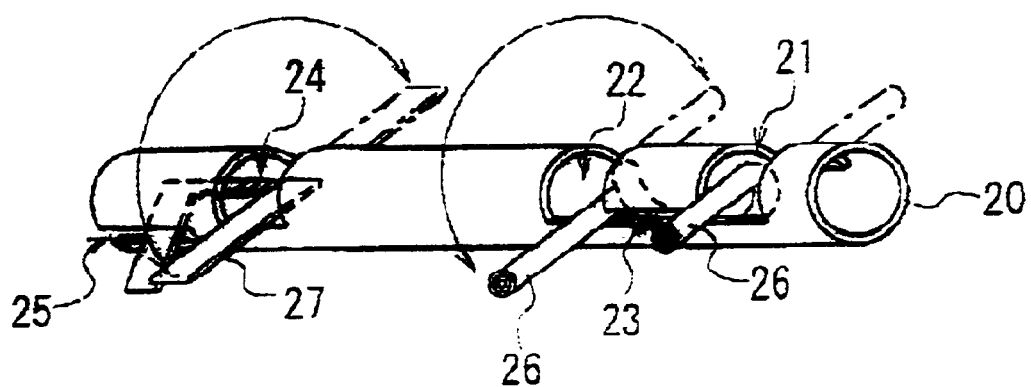
FIG. 7 is a schematic perspective view of the hinge-shaped joint used in the device according to the first embodiment of FIG. 3.

The hinge-shaped joint 15 comprises a hollow, straight shaft 20, as shown in FIG. 7. The shaft 20 is approximately equal to the width of the keyboard package 14. Three openings 21, 22, and 24 and two slits 23 and 25 are formed in the shaft 20 for electrical interconnection. A flexible printed wiring board 27, which is U-shaped, is engaged with the shaft 20 by way of the opening 24 and the slit 25. A coaxial cable 26 is engaged with the shaft 20 by way of the openings 21 and 22. The board 27 and the cable 26 are properly curled in the shaft 20 for the purpose of opening and closing behaviors of the antenna and screen package 12 and 13.

The circuits in the keyboard package 14 and those in the screen package 13 are electrically connected to each other by way of the flexible printed wiring board 27. The board 27, which extends from the screen package 13, enters the inside of the shaft 20 through the opening 24 and then, emits from the shaft 20 through the slit 25. The opening 24 is formed to ensure the board 27 to be pivotable according to the opening and closing behaviors of the package 13. The slit 25 is to ensure the board 27 to penetrate through the same.

The circuits in the screen package 13 and those in the antenna package 12 are electrically connected to each other by way of the coaxial cable 26. The cable 26, which extends from the antenna package 12, enters the inside of the shaft 20 through the opening 22 and then, emits from the shaft 20 through the opening 21. The opening 22 is formed to ensure the cable 26 to be pivotable according to the opening and closing behaviors of the screen package 13. The opening 21 is formed to ensure the cable 26 to be pivotable according to the opening and closing behaviors of the antenna package 12. The slit 23 is formed to facilitate the insertion of the cable 26 into the shaft 20.

With the portable radio device 10 according to the first embodiment of the invention, as explained above, the antenna package 12 is connected pivotably to the keyboard package 14 around the specific axis (i.e., the shaft 20) with the joint 15 and at the same time, the screen package 13 is connected pivotably to the keyboard package 14 around the same axis with the joint 15 to be adjacent to the antenna package 12. The antenna 11 is attached to the package 12.

Also, each of the antenna and screen packages 12 and 13 can be held at a desired angle with respect to the keyboard package 14 as necessary if the desired angle is within its maximum tilt angle. The antenna package 12 is pivotable to its maximum angle less than 180° around the axis while the screen package 13 is pivotable to its maximum angle of 180° around the same axis.

Therefore, independent of the tilt angle of the screen package 13 with respect to the keyboard package 14 and the location where the device 10 is used, the tilt angle of the antenna package 12 (i.e., the tilt angle of the antenna 11) can be determined or adjusted as desired. As a result, the gain characteristic of the antenna 11 can be optimized optionally.

Moreover, when the device to according to the first embodiment is placed on the surface of a desk, the outer or back surface of the screen package 13 is contacted with the desk surface if the package 13 is completely opened. In this case, however, the antenna package 12 has the stopper 18 at its bottom end (near the joint 15) and therefore, as clearly shown in FIG. 4, the stopper 18 will contact the back end of the keyboard package 14. This prevents the back surface of the package 12 from contacting the desk surface even if the package 12 is completely opened. As a result, the loss of the antenna gain due to impedance mismatching can be suppressed in spite of the desk surface being made of metal.

Needless to say, the whip antenna 11 may be replace with a fixed coil-shaped antenna in the first embodiment.

Second Embodiment

Figure 8:
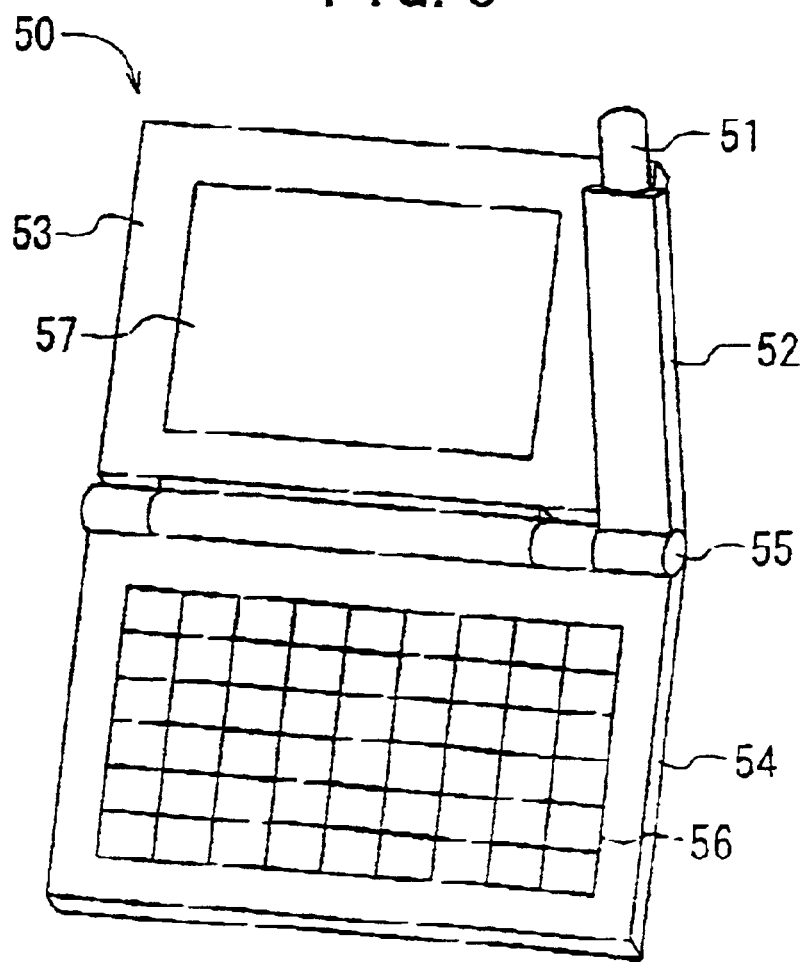
FIG. 8 is a schematic perspective view of a folding, portable radio device according to a second embodiment of the invention, which is designed as a portable information terminal.

FIG. 8 shows a folding, portable radio device 30 according to a second embodiment of the invention, which is designed as a portable information terminal like the first embodiment.

Figure 9:
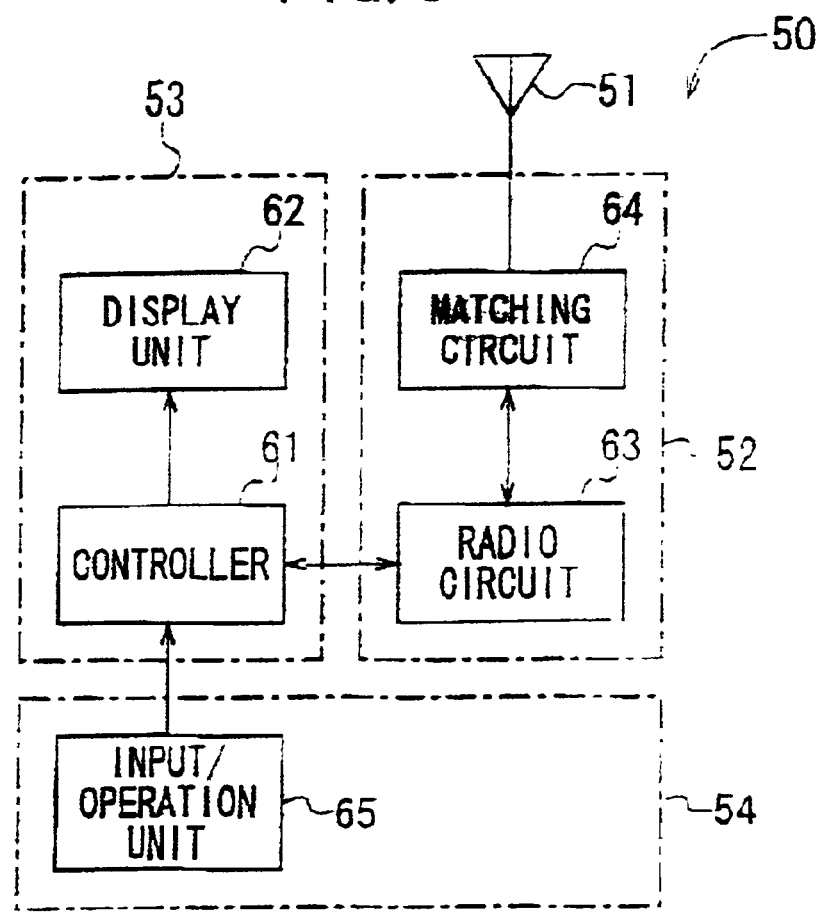
FIG. 9 is a functional block diagram showing the circuit configuration of the device according to the second embodiment of FIG. 8.
Figure 10:
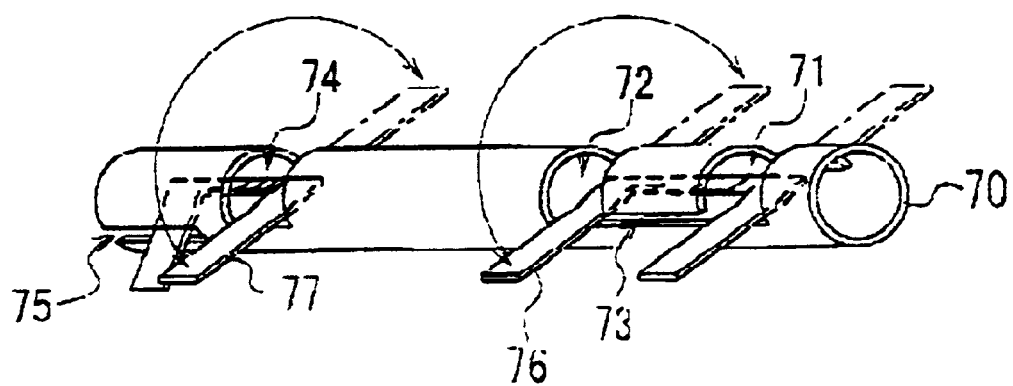
FIG. 10 is a schematic perspective view of the hinge-shaped joint used in the device accordingly to the second embodiment of FIG. 8.

The device 50 according to the second embodiment comprises the same configuration as the device 10 according to the first embodiment of FIG. 3, except that (i) the radio circuit section 63 is located in the antenna package 52, as shown in FIG. 9, (ii) the antenna 51 is a fixed, coil-shaped one, as shown in FIG. 8, and (iii) the electrical interconnection among the packages 52, 53, and 54 is formed as shown in FIG. 10. Therefore, the detailed description about the same configuration is omitted here for the sake or simplification of description.

To be seen from FIGS. 10 and 7, in the device 50 according to the second embodiment, the circuits in the keyboard package 54 and those in the screen package 53 are electrically connected to each other by way of the printed wiring board 77. The board 77, which extends from the unit 53, enters the inside of the shaft 70 through the opening 74 and then, emits from the shaft 70 through the slit 75. The opening 74 is formed to ensure the board 77 to be pivotable according to the opening and closing behaviors of the package 53. The slit 75 is formed to ensure the board 77 to penetrate through the same.

The circuits in the screen package 53 and those in the antenna package 52 are electrically connected to each other by way of the printed wiring board 76. The board 76, which extends from the package 52, enters the inside of the shaft 70 through the opening 72 and then, emits from the shaft 70 through the opening 71. The opening 72 is formed to ensure the board 76 to be pivotable according to the opening and closing behaviors of the screen package 53. The opening 71 is formed to ensure the board 76 to be pivotable according to the opening and closing behaviors of the antenna package 52. The slit is formed to facilitate the insertion of the board 76 into the shaft 70.

With the portable radio device 50 according to the second embodiment of the invention, the same advantages as those in the first embodiment can be given.

Also, since the radio circuit section 63 and the impedance matching circuit 64 are incorporated into the antenna package 52, the distance between the radio circuit section 63 and the antenna 51 is decreased. At the same time as this, the pivotable interconnection between the radio circuit section 63 and the antenna 51 is eliminated. As a result, there is an additional advantage that the transmission and reception characteristics of radio waves can be improved compared with the device 10 according to the first embodiment. This is because the cause of the gain loss is suppressed.

Third Embodiment

Figure 11:
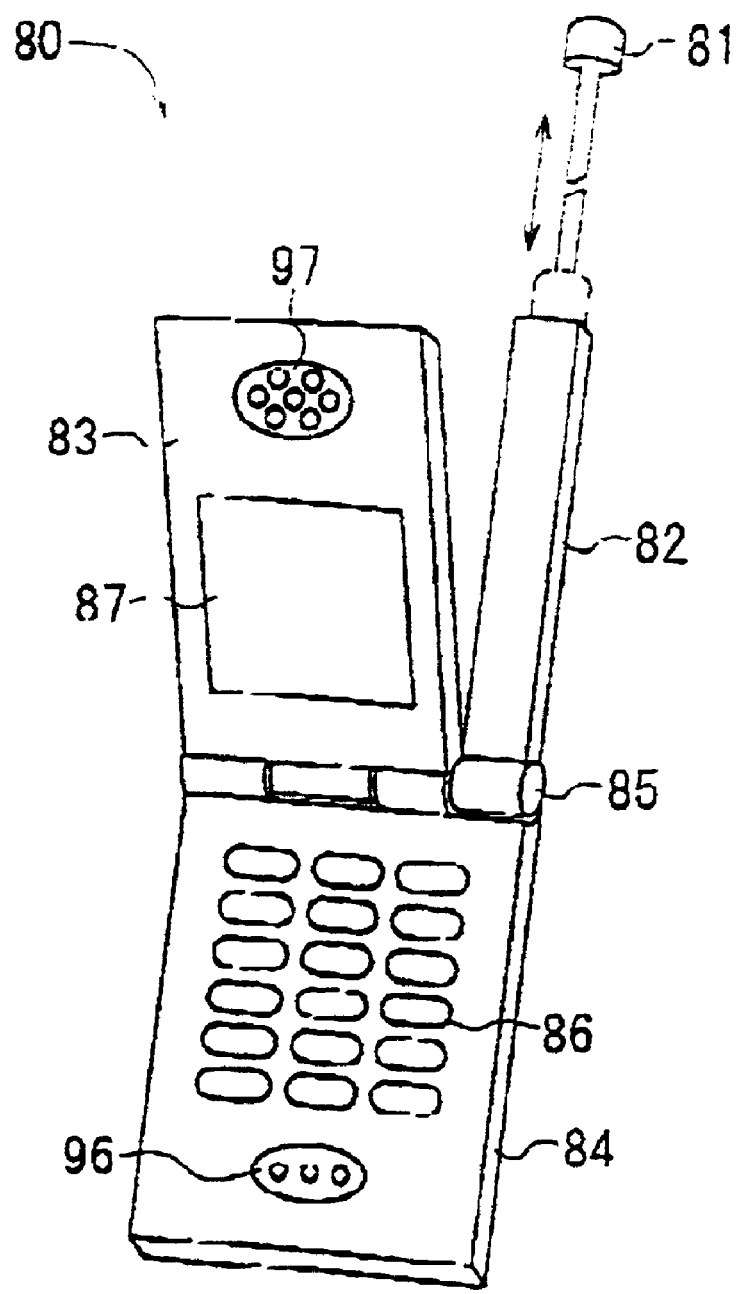
FIG. 11 is a schematic perspective view of a folding, portable radio device according to a third embodiment of the invention, which is designed as a portable or cellular telephone.

FIG. 11 shows a folding, portable radio device 80 according to a third embodiment of the invention, which is designed as a portable or mobile telephone unlike the first and second embodiments.

The device 80 according to the third embodiment comprises an antenna package 82 with a telescopic whip antenna 81, a receiver package 83 with a display screen 87 and a speaker 97, and a transmitter package 84 with a set of operation keys 86 and a microphone 96. The antenna package 82 and the receiver package 83 are pivotably connected to the transmitter package 84 with a hinge-shaped joint 85. The joint 85 is fixed at the rear edge of the package 84. Thus, the packages 82 and 83 can be pivoted around the joint 85.

Figure 12:
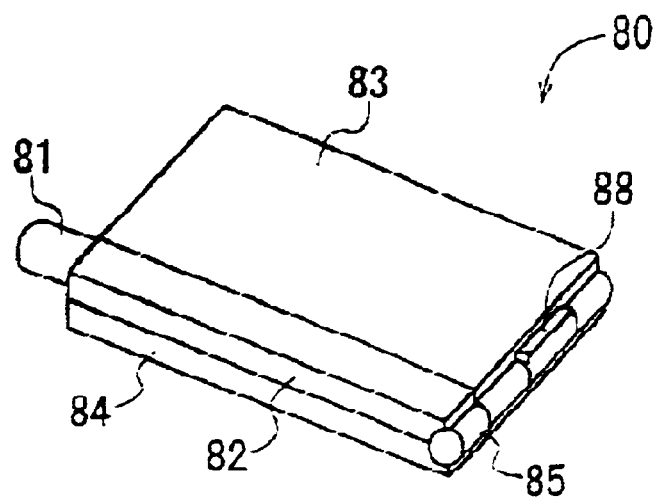
FIG. 12 is a schematic perspective view of the device according to the third embodiment of FIG. 11, in which all the packages are folded.
Figure 13:
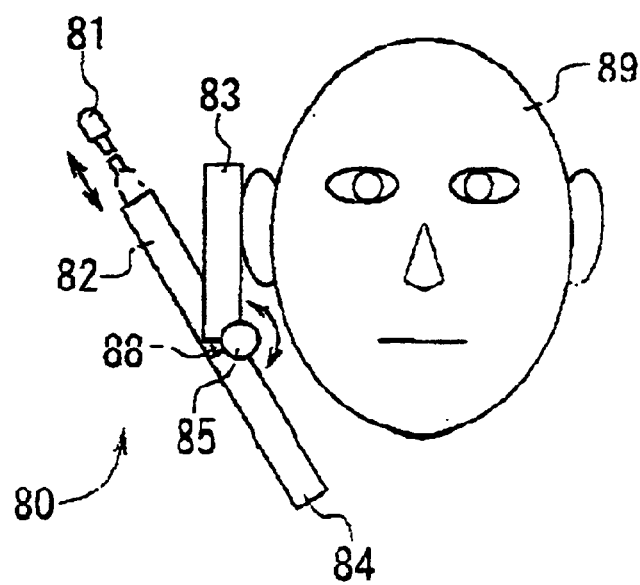
FIG. 13 is a schematic view showing the state where the device according to the third embodiment of FIG. 11 is in use, in which the device is located near the head of a person.

As shown in FIG. 12, both of the antenna and receiver packages 82 and 83 can be completely closed. Also, as shown in FIGS. 11 and 13, the receiver package 83 can he completely opened in such a way as to be placed at a tilt angle of 180° with respect to the transmitter package 84. Unlike this, the antenna package 82 cannot be completely opened in such a way as to be placed at a tilt angle of 180° with respect to the package 84. The maximum tilt angle of the package 82 with respect to the package 84 is set at a specific angle less than 180° for facilitating the telephone call. For this purpose, a rigid stopper 88 is provided at the bottom end of the package 83 as a pivot angle limiter, as shown in FIGS. 12 and 13.

The antenna package 82 can be held at a desired angle with respect to the transmitter package 84 a necessary if the desired angle is within its maximum tilt angle. Similarly, the receiver package 83 can be held at a desired angle with respect to the transmitter package 84 as necessary if the desired angle is within its maximum tilt angle. The holding operation of the packages 82 and 83 at desired angles is realized by friction at the joint 85.

Figure 14:
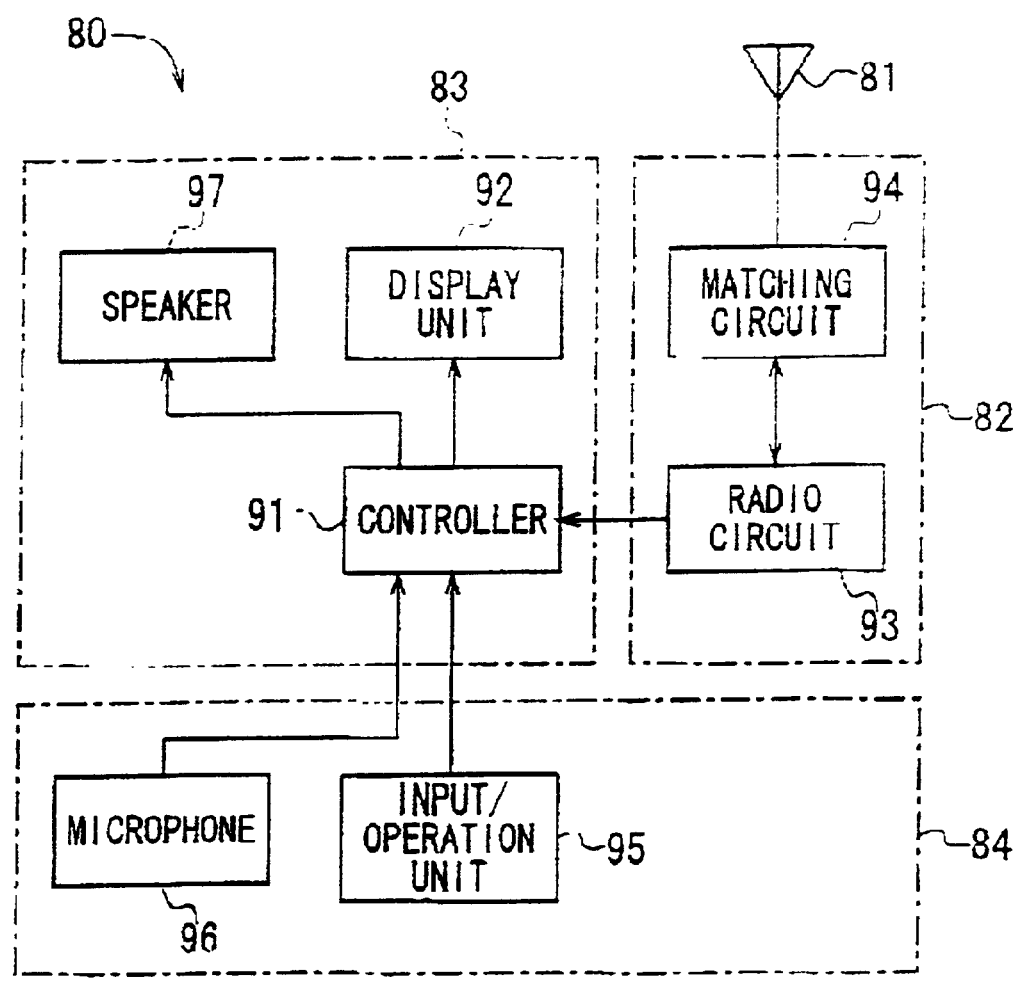
FIG. 14 is a functional block diagram showing the circuit configuration of the device according to the third embodiment of FIG. 11.

The device 80 according to the third embodiment has a circuit configuration as shown in FIG. 14, which is the same as that of conventional devices or this type. As shown in FIG. 14, the device 80 comprises a controller section 91, a display unit 92, a radio circuit section 93, an impedance matching circuit 94, an input/operation unit 95, the microphone 96, and the speaker 97. The controller section 91 includes a microcomputer for controlling the entire device operation. The impedance matching circuit 94 and the radio circuit section 93 are located in the antenna package 92 along with the antenna 81. The controller section 91, the display unit 92, and the speaker 97 are located in the receiver package 83 along with the screen 87. The input operation unit 95 and the microphone 96 are located in the transmitter package 84 along with the set of operation keys 86.

The user of the device 80 applies a desired phone number to the device 80 with the set of operation keys and provides specific voice information to the device 80 with the microphone 96. The input/operation 95 converts the phone number thus inputted to an electric signal and send it to the controller section 91. The microphone 96 generates an electric signal according to the voice information and then, sends it to the controller section 91. The controller section 91 controls the entire operation of the device 80. The section 91 sends the electric signals corresponding to the phone number and the voice information to the ratio circuit section 93 while sending a display signal to the display unit 92, thereby displaying the phone number thus dialing and specific relating information on the screen 87. The radio circuit section 93 generates a transmission signal according to the voice information to be transmitted and then, sends it to the antenna 81 by way of the matching circuit 94, transmitting the signal to a desired person.

On the other hand, when the antenna 81 receives radio waves from the person talked with the user, it generates a reception signal and sends it to the radio circuit section 93 by way of the matching circuit 94. The reception signal is then sent to the speaker 97 by way of the controller section 91, emitting a voice message according to the reception signal.

The receiver package 83 has a shape of approximately rectangular flat box in which the controller section 91, the display package 92 and the speaker 97 art incorporated. The rectangular screen 87 is provided on the inner surface of the package 83, as shown in FIG. 11. The screen 87 will be opposite to the keyboard 86 in the transmitter package 84 when the device 80 is in the closed state as shown in FIG. 12. The screen 87 and the display unit 92 may be preferably formed by a so-called flat panel display with low power consumption, such as a LCD, FED, or the like.

The antenna package 82 has a shape of an elongated box having a rectangular cross section, in which the whip antenna 81 is mounted and the matching circuit 94 is incorporated. The upper end of the package 82, which is opposite to the joint 85, is opened. The top of the antenna 81 is protruded from the package 82 by way of its opening top end. The impedance matching circuit 94 is located between the radio circuit section 93 and the antenna 81.

The transmitter package 84 has a shape of approximately rectangular flat box in which the input operation 95 and a power supply circuit (not shown) are incorporated. The set of operation keyboards 86 of the package 84 are mounted in such a way as to be located on the upper surface of the package 84. The overall size of the package 84 is approximately equal to the sum of the surface areas of the packages 83 and 82.

The hinge shaped joint 85 comprises a hollow, straight shaft, as shown in FIG. 10. The shaft is approximately equal to the width of the transmitter package 84. A flexible printed wiring board is engaged with the shaft by way of the openings and slits.

The circuits in the transmitter package 84 and those in the receiver package 83 are electrically connected to each other by way of the flexible circuit board. The circuits in the receiver package 83 and those in the antenna package 82 are electrically connected to each other by way of the flexible printed wiring board.

With the portable radio device 80 according to the third embodiment of the invention, the antenna package 82 is connected pivotably to the transmitter package 84 around the specific axis (i.e., the shaft) with the joint 85 and at the same time, the receiver package 83 is connected pivotably to the same transmitter package 84 around the same axis with the joint 85 to be adjacent to the antenna package 82. The antenna package 82 is pivotable to the maximum angle less than 180° around the axis while the receiver package 83 is pivotable to the maximum angle of 180° around the same axis.

Therefore, independent of the tilt angle of the receiver package 83 with respect to the transmitter package 84 and the location where the device 80 is used, the tilt angle of the antenna package 82 (i.e., the tilt angle of the antenna 81) can be determined or adjusted as desired. As a result, the gain characteristic of the antenna 81 can be optimized optionally.

Moreover, when the device 80 according to the third embodiment is placed on the surface of a desk, the outer or back surface of the receiver package 83 is contacted with the desk surface if the package 83 is completely opened. In this case, however, the antenna package 82 has the stopper 88 at its bottom end and thus, as clearly shown in FIG. 13, the stopper 88 will contact the back end of the transmitter package 84. This prevents the back surface of the package 82 from contacting the desk surface even if the package 82 is completely opened. As a result, the loss of the antenna gain due to impedance mismatching can be suppressed in spite of the desk surface being made of metal.

Needless too say, the whip antenna 81 may be replaced with a fixed coil-shaped antenna in the third embodiment.

Variations

It is needless to say that the invention is not limited to the above-described first to third embodiments. For example, although the invention is applied to a portable information terminal or a portable or cellular telephone in the above embodiments, the invention may be applied to any other device.

While the preferred forms of the present invention have been described, it is to be understood that modifications will be apparent to those skilled in the art without departing from the spirit of the invention. The scope of the present invention, therefore, is to be determined solely by the following claims.

What is claimed is:

1. A folding, portable radio device comprising:
   (a) a first package;
   (b) a second package connected pivotably to the first package around a specific axis with a joint; the second package being able to be held at a desired angle with respect to the first package;
   (c) an antenna attached to the second package;
   (d) a third package connected pivotably to the first package around the axis with the joint; the third package being adjacent to the first package; the third package being able to be held at a desired angle with respect to the first package; and
   (e) a radio section mounted on at least one of the first, second, and third packages.

2. The device according to claim 1, wherein the joint comprises a pivot limiter for limiting a maximum angle of the second package with respect to the first package.

3. The device according to claim 1, wherein the joint comprises a first pivot limiter for defining a first maximum angle of the second package with respect to the first package and a second pivot limiter for defining a second maximum angle of the third package with respect to the first package.

4. The device according to claim 1, wherein the antenna is attached telescopically to the second package in such a way as to be drawable from the second package and retractable thereto.

5. The device according to claim 1, wherein the antenna is attached to an opposite end of the second package to the joint.

6. The device according to claim 1, further comprising an information input section, an information processing section, and information output section, thereby enabling radio communication by way of the radio section.

7. The device according to claim 6, wherein the information input section is mounted in the first package while the information processing section and the information output section are mounted in the third package.

8. The device according to claim 1, wherein the radio section is mounted in the third package along with the information output section.

9. The device according to claim 1, wherein the radio section is mounted in the second package along with the antenna.

10. The device according to claim 1, wherein the first package includes a keyboard and the second package includes a display screen,
    and wherein the device is configured as a portable information terminal.

11. The device according to claim 1, wherein the first package is includes a microphone and the second package includes a speaker, and wherein the device is configured as a portable telephone.

12. The device according to claim 1, wherein the joint includes a hollow shaft with a first slit and a second slit;
and wherein the third package is electrically connected to the first package by way of a flexible printed wiring board engaged with the first slit of the shaft;
and wherein the second package with the antenna is electrically connected to the first package by way of a coaxial cable engaged with the second slit of the shaft.

13. The device according to claim 1, wherein the joint includes a hollow shaft with a first slit and a second slit;
and wherein the third package is electrically connected to the first package by way of a first flexible printed wiring board engaged with the first slit of the shaft;
and wherein the second package with the antenna is electrically connected to the first package by way of a second flexible printed wiring board engaged with the second slit of the shaft.

* * * * *